Dec. 12, 1939.  E. R. HACMAC  2,182,984
BEATER AND MIXER
Filed May 16, 1938
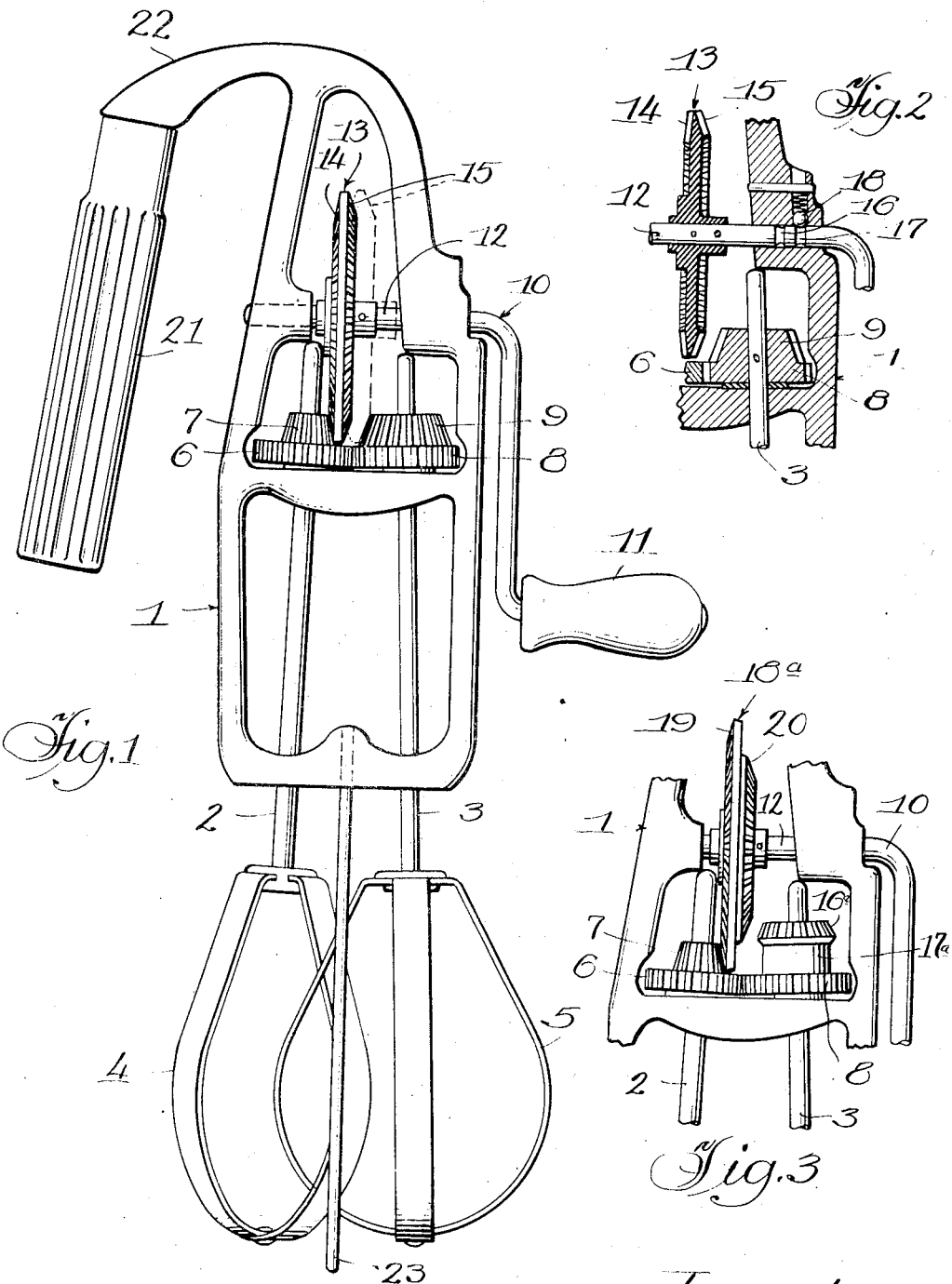
Witness:
Chas. R. Koursh.
Inventor,
Edward R. Hacmac
Clarence J. Loftus, Atty.

UNITED STATES PATENT OFFICE 2,182,984

BEATER AND MIXER

Edward R. Hacmac, Hollywood, Calif., assignor to Na-Mac Products Corporation, Hollywood, Calif., a corporation of California Application May 16, 1938, Serial No. 208,132

1 Claim. (Cl. 74—325)

The present invention relates to a novel construction of beater and mixer and more particularly to a novel gearing and operating mechanism providing a dual speed arrangement.

Among the objects of the present invention is the provision of a novel gearing arrangement for an interdigitating beater and mixer so constructed and combined as to provide quick adjustment for different speeds as required in the operation of the device.

A further object is to provide a novel operating mechanism for a portable and manually operable interdigitating beater and mixer having adjustable means for varying the speed of operation.

A still further object of the present invention is the provision of a novel speed change mechanism for a beater and mixer and comprising a pair of intermeshing gears and pinions differing in size and adapted for rotation in fixed planes, and an adjustable gear having a gear face on each of its sides adapted for engagement with its complementary or respective pinion.

Further objects, advantages and capabilities will be apparent from the disclosure or are inherent in the device.

In the drawing:

Fig. 1 is a view in side elevation of my novel beater and mixer.

Fig. 2 is a fragmentary view in vertical cross section of the adjustable shaft and common drive gear of Fig. 1.

Fig. 3 is a fragmentary view in side elevation of an alternate form of gearing or operating mechanism.

Referring more particularly to the disclosures in Figs. 1 and 2 of the drawing, there is disclosed a novel construction of mixer and beater provided with a skeleton or cutaway frame 1 in which are rotatably mounted driven shafts 2 and 3 having secured to their lower ends the usual interdigitating beaters or mixers 4 and 5, respectively. Secured or pinned to the shaft 2 adjacent its upper end is a gear 6 having a fixed bevel gear or pinion 7 on its upper surface. The gear 6 meshes with a gear 8 secured or keyed on the shaft 3, and this gear 8 has secured on its upper surface a bevel gear or pinion 9. The bevel gears or pinions 7 and 9 are shown of different diameters for the purpose of securing different speeds of rotation of the driven gears 6 and 8 and their respective shafts and beaters.

Rotatably mounted in bearings formed in the skeleton frame 1 is a rotatable drive shaft 10 having secured on its outer end a handle 11 for manual rotation. The horizontal portion 12 of the shaft 10 is longitudinally slidable in these bearings and secured or keyed to this shaft is a gear 13 having gear faces 14 and 15 on its opposite sides with the teeth of the face 14 adapted to be moved into meshing engagement with the bevel gear or pinion 7, while the teeth of the face 15 are adapted to be moved into meshing engagement with the teeth on the bevel gear 9. Thus, it will be apparent that when the teeth on the face 14 are in meshing engagement with the teeth on the bevel gear or pinion 7, this gear 13 will drive the bevel gear or pinion 7, gear 6 and gear 8 so as to rotate the shafts 2 and 3 and their respective beaters 4 and 5 in opposite directions.

In order to retain the bevel drive gear 13 in meshing engagement with the gear or pinion 7 or with the gear or pinion 9, means are provided for locking the shaft 12 in either position of adjustment. This is accomplished by means of a pair of spaced annular races 16 and 17 formed in the shaft adapted to interlock with a spring pressed ball or detent 18. This ball or detent will permit ready manual shifting of the shaft but prevent accidental displacement or separation of the intermeshing bevel gears after the bevel gear 13 has been moved into intermeshing engagement with either of the gears or pinions 7 and 9.

In Fig. 3 there is disclosed an alternate construction of bevel gear or pinion 16a mounted upon a raised hub 17a formed on or secured to the gear 8. In order to drive this bevel gear or pinion 16a, the bevel drive gear 18a is provided with a gear face 19 adjacent its periphery and which is adapted to mesh with the bevel gear or pinion 7 while the opposite gear face 20 is provided with bevel teeth of lesser radius adapted to be moved into meshing engagement with the bevel gear or pinion 16a.

In order to securely hold the beaters or mixers in a position for operation, the invention comprehends a handle 21 suitably attached or threaded to a projection 22 providing sufficient clearance between the handle and the frame for the insertion of the hand of the user. So that the beaters 4 and 5 do not contact or scrape upon the bottom of a bowl or other container, I provide a U-shaped member or stirrup 23 extending beyond the lower ends of the beaters so as to space and maintain them a distance from the bottom of the container.

I claim:

In a beater and mixer having a supporting frame, a drive shaft provided with an operating handle and a pair of driven shafts, means for driving the driven shafts at two speeds comprising a double faced gear secured on the drive shaft, intermeshing gears on the driven shafts, a pinion on each of the driven shafts, one pinion being of less diameter than the other, the drive shaft being movable longitudinally whereby its gear may engage one or the other of the pinions on the driven shafts, spaced annular races on the drive shaft, and a spring pressed member in the frame adapted to be locked in one or the other of said races to automatically maintain the drive shaft gear in engagement with one or the other of the driven shaft pinions.

EDWARD R. HACMAC.